UNITED STATES PATENT OFFICE.

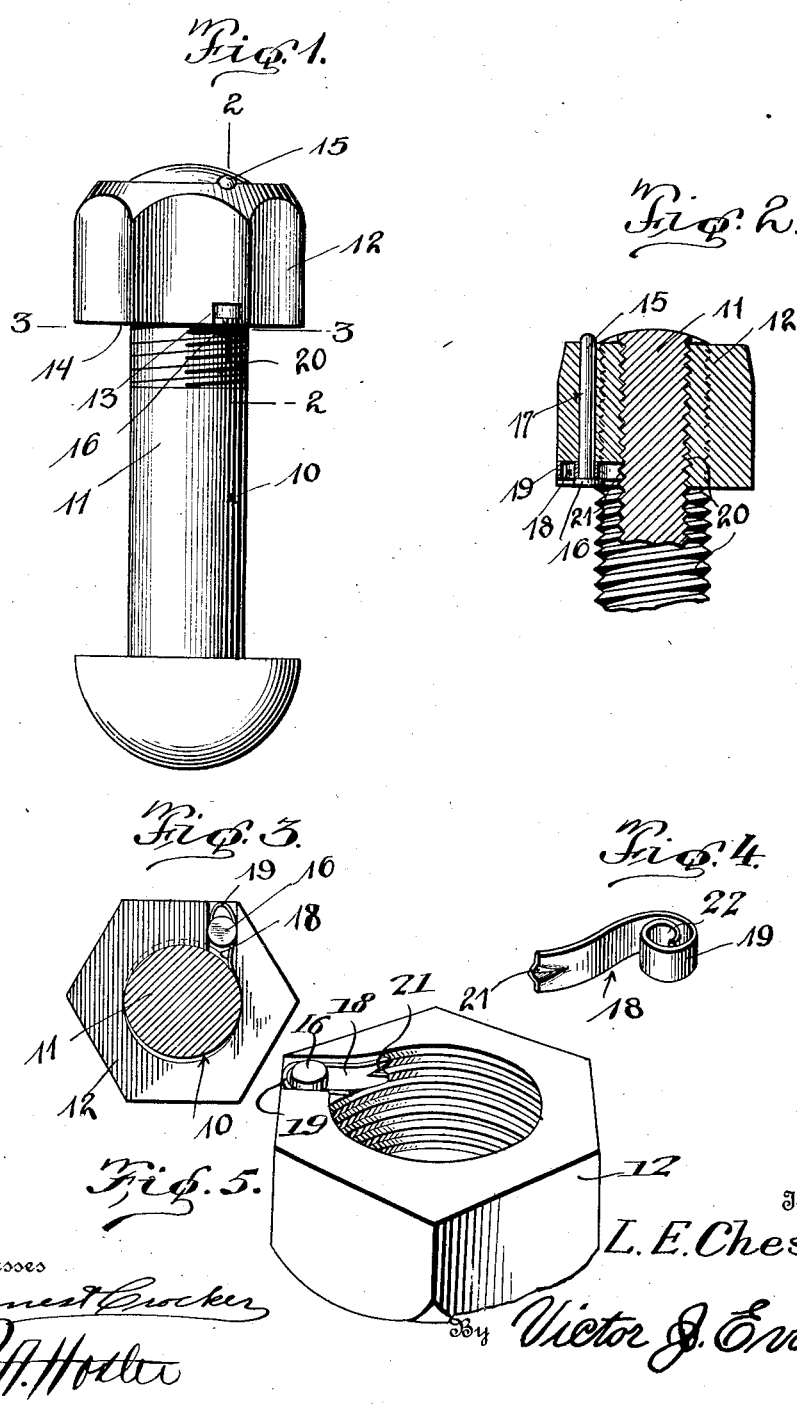

LOMEN E. CHESNEY, OF STEUBENVILLE, OHIO.

NUT-LOCK.

1,091,293. Specification of Letters Patent. Patented Mar. 24, 1914.

Application filed December 11, 1912. Serial No. 736,172.

*To all whom it may concern:*

Be it known that I, LOMEN E. CHESNEY, a citizen of the United States, residing at Steubenville, in the county of Jefferson and State of Ohio, have invented new and useful Improvements in Nut-Locks, of which the following is a specification.

An object of the invention is to provide a device for rigidly locking a nut on the bolt thereof.

The invention embodies, more particularly, the use of a nut adapted to be threaded on a bolt in the usual manner and which is provided with means whereby, when the nut has been arranged in threaded engagement with the bolt, the nut will be held rigidly on the bolt and prevented from accidental disengagement therewith.

The invention is particularly adapted for use in connection with railroad ties and the fish plates thereof for binding the fish plates to the rail ends in order to efficiently connect the same.

In the further disclosure of the invention reference is to be had to the accompanying drawings, constituting a part of this specification, in which similar characters of reference denote corresponding parts in all the views, and in which:

Figure 1 is a side elevation, showing the nut, provided with my locking means, arranged upon a bolt and in locked position thereon; Fig. 2 is a vertical transverse sectional view taken on the line 2—2 in Fig. 1; Fig. 3 is a fragmentary longitudinal sectional view taken on the line 3—3 in Fig. 1; Fig. 4 is a perspective view of the spring-like locking member, and Fig. 5 is a perspective view of the nut inverted so as to show the position of the spring dog in the nut.

Referring more particularly to the views, I disclose a bolt 10 having a shank 11 thereof threaded and adapted to threadedly receive the usual nut 12. A recess 13 is formed in the inner face of the nut and extends from the bolt receiving opening to and out through one side of the nut. The said recess has a depth a little greater than the distance between two convolutions of the thread. One wall of the recess 13 is arranged nearly tangentially to the inner periphery of the nut and the innermost thread groove of the nut is located centrally of the inner end of this tangential wall. An opening 17 extends from and through the bottom wall of the recess 13 to and out through the outer face of the nut. A dog carrying pin 15 is arranged in the opening 17 and is provided with a head 16 located in the tangential recess 13, the small end of the pin 15 projecting slightly beyond the outer face of the nut.

A spring dog carried by the pin 15 is arranged in the recess 13. The dog is constructed from a single length of elastic material, and consists of a cylindrical body 22, a curved spring arm 18, and a spring loop 19 connecting the body and the arm. Through the medium of the body 22 the dog is secured to the pin 15 which prevents the dog from having any movement longitudinally of the recess 13. The free end of the curved arm 18 projects into the bolt receiving opening of the nut and is provided with an indentation 21, which is located centrally between the upper and lower edges of the arm, and which is adapted to receive the thread of the bolt and to engage in the innermost thread groove of the nut. The indentation is held in the said thread groove by the elasticity of the arm 18 and the loop 19, and this engagement of the indentation within the thread groove holds the pin and dog in applied position when the nut is not in position on a bolt. As the indentation is the only means for holding the pin and dog in applied position, the parts can be easily removed and new ones replaced. As the spring dog cannot be reused after the nut has been removed from a bolt a new one can be readily substituted. This makes the nut lock reusable by only applying a new spring dog.

Having thus described my invention, I claim:

In a nut lock, a nut provided with a recess in its inner face and with a longitudinal opening extending through the nut and terminating in the said recess, the said recess having a depth a little greater than the distance between two convolutions of the thread, a headed pin arranged in the longitudinal opening, said pin having its headed end located in the said recess and its small end projecting slightly beyond the outer face of the nut, a spring dog provided with a cylindrical body portion encircling and frictionally engaging the pin, a connecting portion joining the body portion to a curved arm, said connecting portion being formed into a spring loop, the said curved arm having its free end extending into a bolt opening adjacent the said recess, and an indentation formed in the free end of the curved arm and arranged centrally between the upper and lower edges thereof, said indentation resting in the innermost thread groove of the nut and adapted to provide against the accidental displacement of the spring dog and pin and to receive the thread of the bolt.

In testimony whereof I affix my signature in presence of two witnesses.

L. E. CHESNEY.

Witnesses:
R. G. PORTER,
F. S. KING.

Copies of this patent may be obtained for five cents each, by addressing the "Commissioner of Patents, Washington, D. C."